9813X
G. Sherwood,
Derrick.
Patented June 30, 1836.
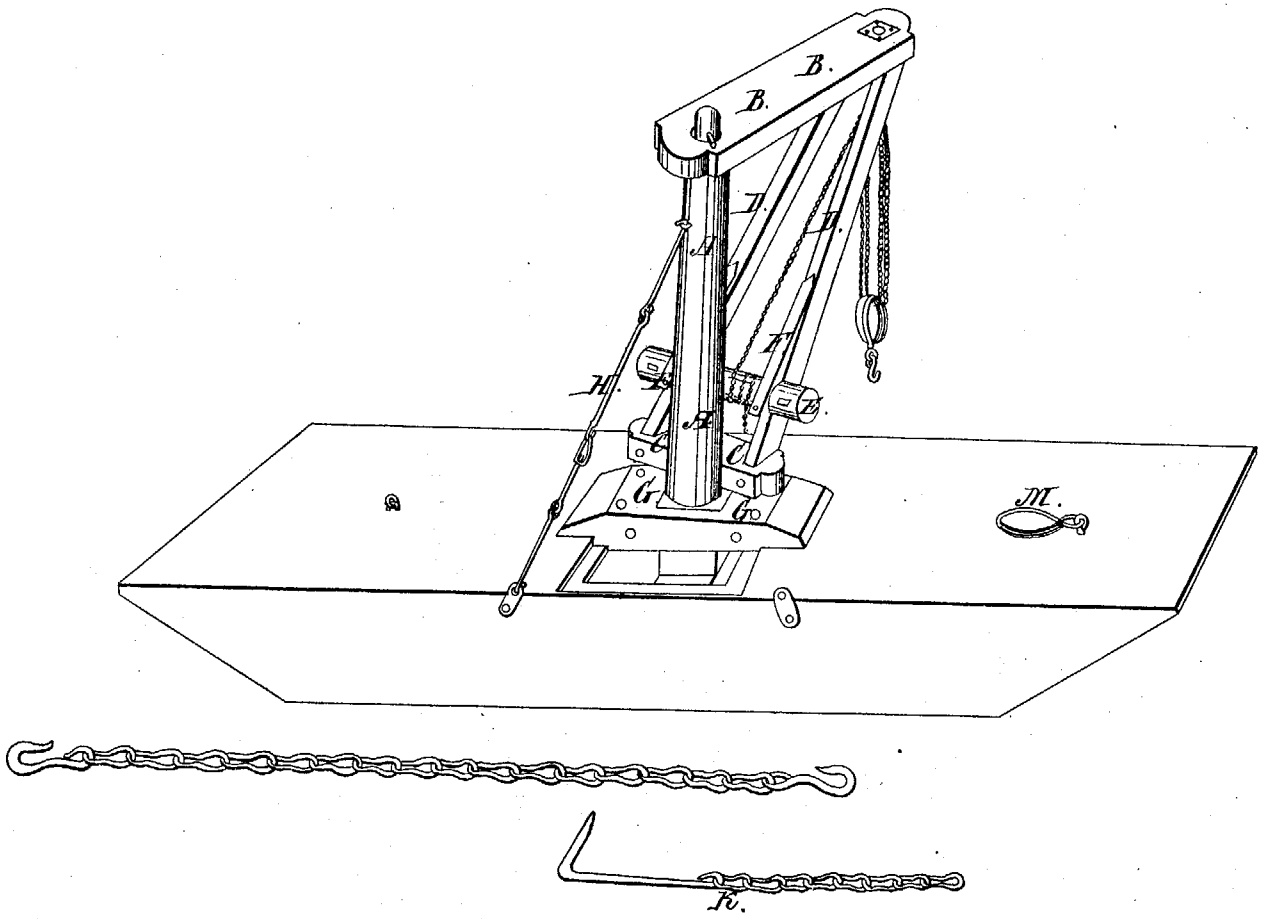
AM. PHOTO-LITHO. CO. N.Y. (OSBORNE'S PROCESS)

June 30. 1836 177

9813X

Gilbert Sherwood of Erie, State of Pennsylvania

Letters Patent.

The schedule referred to in these Letters Patent and making part of the same containing a description in the words of the said Gilbert Sherwood himself of his improvement in the Crane To all to whom these presents shall come.

Be it known that I Gilbert Sherwood of Erie in the County of Erie and State of Pennsylvania, have invented a new and useful improvement in the Crane and that the following is a full and exact description thereof, — 1st A stationary Crane post designated by the letters A. A. in the accompanying draft (entitled "Sherwoods Improved Crane,") setting perpendicularly on a step and secured in position by the partners E. E. This post is about sixteen feet long and fourteen inches in diameter at the partners and ten inches at the top, On the top of the Crane Post is a pivot five inches in diameter and six long 2nd A Crane cap marked B. B. in the said draft twelve inches wide and three inches deep and nine feet long with a hole twelve inches from the one end of the sufficient size to admit the pivot of the Crane Post. The cap is placed horizontally on the Crane post playing freely on the pivot, The opposite end being supported by the braces marked D.D in said draft, — 3d A saddle marked C, C, in said draft two and a half feet long fourteen inches wide by twelve deep resting on the partners and playing round the foot of the crane post at right angles to the crane cap, — 4th two braces marked D. D. in said draft. these braces are three inches thick by six deep and extend one from each end of the saddle to the end of the Crane Cap which they support. they are tenoned into the top of the saddle and bottom of the Crane Cap three inches from the end of each leaving at the

9813X point of the Crane Cap three inches between the braces.
5.th A windlass marked C. in the said draft three feet long
and nine inches in diameter affixed to the top of the braces
two feet from their junction with the saddle by caps marked F.
in said draft, these caps are about six feet long and of the
same thickness with the braces, to which they are fastened by
bolts. The Partners G. G. are fifteen inches wide by twelve
The saddle is likewise rivetted horizontally by iron bolts
inches deep and should be rivetted with iron bolts, to pre-
vent splitting — Near the end of the Crane Cap, exactly
between the ends of the braces is a hook for the purpose of fastening
a tackle &c, this hook is secured by an iron plate on the
top of the Crane Cap and is of sufficient strength to support
several tons weight
6.th A Stone hook marked in said draft with the letter
K, this is made of a bar of iron one inch square, with
hook one foot long and shank three feet long with a becket
attached to the handle, — The improved Crane is design
to be used on board of scows in raising stone and any other
heavy bodies from the water and in raising and moving timber
and stone in building of wharfs &c. — The feature and prin-
-ciple by which it may be distinguished from other Cranes
is the saddle and two braces, by means of which any amount
of power may be applied to move the body suspended from
the Crane, horizontally without danger of diminishing the
strength of the crane or endangering its breaking, In use the
Crane should be erected in the centre of the scow, and in
addition to the partners the crane post is further suppor-
ted by stay chains. In raising weights with the crane
a tackle is attached to the hook on the crane cap with
the fall fastened to the windlass — when the body is raised
sufficiently, it is moved horizontally to the place desired on
by another tackle fixed to some part of the scow
the scow, when the stone to be raised lies close to the ground
the stone hook is forced under one side of it after which the

9813X bucket is hitched to the teagle and the stone raised sufficient to admit the wrapping chain beneath it Witness
Salem Foster
J. E. Morrison Gilbert Sherwood Drawing